United States Patent
Lee et al.

(10) Patent No.: US 11,916,626 B2
(45) Date of Patent: Feb. 27, 2024

(54) METHOD AND DEVICE FOR BEAM TRAINING USING BEAMFORMING CODEBOOK

(71) Applicants: Samsung Electronics Co., Ltd., Suwon-si (KR); Industry-Academic Cooperation Foundation, Yonsei University, Seoul (KR)

(72) Inventors: Seunghyun Lee, Suwon-si (KR); Chahyeon Eom, Seoul (KR); Kwonjong Lee, Suwon-si (KR); Chungyong Lee, Seoul (KR); Jieun Yu, Seoul (KR); Hyungje Lee, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 292 days.

(21) Appl. No.: 17/515,218

(22) Filed: Oct. 29, 2021

(65) Prior Publication Data
US 2023/0033266 A1     Feb. 2, 2023

(30) Foreign Application Priority Data
Jul. 20, 2021 (KR) .......................... 10-2021-0095170

(51) Int. Cl.
*H04B 7/04* (2017.01)
*H04B 7/0456* (2017.01)
*H04B 7/06* (2006.01)

(52) U.S. Cl.
CPC ......... *H04B 7/0456* (2013.01); *H04B 7/0617* (2013.01); *H04B 7/0695* (2013.01)

(58) Field of Classification Search
CPC .. H04B 7/0456; H04B 7/0617; H04B 7/0695; H04B 7/0404; H04B 7/0619; H04B 7/0626
See application file for complete search history.

(56) References Cited

U.S. PATENT DOCUMENTS

| 10,966,253 B2 | 3/2021 | Kim et al. |
| 2014/0187168 A1 | 7/2014 | Seol et al. |

(Continued)

FOREIGN PATENT DOCUMENTS

| KR | 10-2014-0092951 A | 7/2014 |
| KR | 10-2018-0050025 A | 5/2018 |
| WO | 2018/084498 A1 | 5/2018 |

OTHER PUBLICATIONS

Wang et al., "Beam Codebook Based Beamforming Protocol for Multi-Gbps Millimeter-Wave WPAN Systems", Nov. 2009, 6 pages.

(Continued)

*Primary Examiner* — Syed Haider

(57) ABSTRACT

The disclosure relates to a 5G or pre-5G communication system for supporting higher data transmission rates than 4G communication systems such as LTE systems. According to an embodiment, a method performed by a base station supporting beam training using a beamforming codebook may comprise storing a plurality of codebooks corresponding to a plurality of different beamwidths, receiving a beam adjustment request from a user equipment (UE), determining, among the plurality of codebook, a codebook including beam codebooks for beam coverages including a beamwidth corresponding to a channel state of the UE, in response to receiving the beam adjustment request, and transmitting, to the UE, signals that are beamformed based on the codebook through a plurality of transmission beams using digital beamforming matrixes of the codebook.

16 Claims, 12 Drawing Sheets

(56) References Cited

U.S. PATENT DOCUMENTS

| | | | |
|---|---|---|---|
| 2018/0131426 A1 | 5/2018 | Lee et al. | |
| 2018/0198511 A1* | 7/2018 | Maamari | H04B 7/0626 |
| 2019/0173537 A1* | 6/2019 | Cai | H04B 7/0608 |
| 2021/0028832 A1* | 1/2021 | Liu | H04B 7/0617 |
| 2021/0058121 A1* | 2/2021 | Oteri | H04L 25/0204 |
| 2022/0060239 A1* | 2/2022 | Liu | H04B 7/0639 |

OTHER PUBLICATIONS

Alkhateeb et al., "Channel Estimation and Hybrid Precoding for Millimeter Wave Cellular Systems", Jan. 29, 2014, 36 pages.

Lin et al., "Subarray-Based Coordinated Beamforming Training for mmWave and Sub-THz Communications", IEEE Journal on Selected Areas in Communications, vol. 35, No. 9, Sep. 2017, 12 pages.

Chen et al., "Two-Step Codeword Design for Millimeter Wave Massive MIMO Systems with Quantized Phase Shifters", Feb. 15, 2020, 10 pages.

* cited by examiner

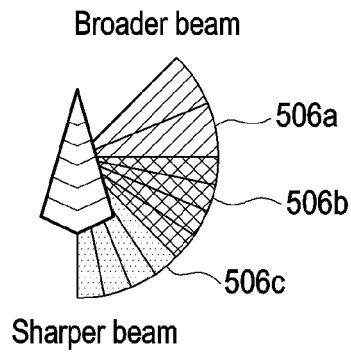
FIG.5C
FIG.6A
FIG.6B

METHOD AND DEVICE FOR BEAM TRAINING USING BEAMFORMING CODEBOOK

CROSS-REFERENCE TO RELATED APPLICATION

This application is based on and claims priority under 35 U.S.C. § 119 to Korean Patent Application No. 10-2021-0095170, filed on Jul. 20, 2021, in the Korean Intellectual Property Office, the disclosure of which is herein incorporated by reference in its entirety.

BACKGROUND

1. Field

Various embodiments of the disclosure relate to a method and device for providing a codebook and design for beam training.

2. Description of Related Art

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the $\frac{1}{10}$ radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems, a full-duplex technology for enabling an uplink transmission and a downlink transmission to simultaneously use the same frequency resource at the same time, a network technology for utilizing satellites, high-altitude platform stations (HAPS), and the like in an integrated manner, an improved network structure for supporting mobile base stations and the like and enabling network operation optimization and automation and the like, a dynamic spectrum sharing technology via collision avoidance based on a prediction of spectrum usage, an use of artificial intelligence (AI) in wireless communication for improvement of overall network operation by utilizing AI from a designing phase for developing 6G and internalizing end-to-end AI support functions, and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

Standard specifications for 5G communication systems, such as new radio (NR) developed after 4G, such as long term evolution (LTE), support not only the 4G cellular band (e.g., 450 MHz to 6 GHz) but also the millimeter wave band (e.g., 24.25 GHz to 52.6 GHz). 5G utilizes a higher center frequency and broadens the use bandwidth, thereby increasing data rate and enhancing the utilization of spatial resources through beamforming. To support various scenario cases and advanced requirements in post-5G and 6G communication systems, it is considered to utilize, e.g., sub-terahertz (sub-THz) or THz bands. Therefore, there is growing importance of beamforming that may maximize the utilization of resources and element technologies considering channel characteristics of THz.

SUMMARY

A high frequency band, such as sub-THz or THz, may use more antennas than a lower frequency band, and may use more antennas for beam gain. This may impose limitations to sub-THz or THz, such as a reduction in beamwidth and inability to operate wider beams. To overcome the above limitations and support beam coverage by changing beamwidths, subarray-based beam training techniques have been studied. Also studied have been hybrid precoding-based beamforming and beam training techniques to reduce beam training overhead by generating beams of various beamwidths.

In systems that generate a codebook through conventional techniques for generating beams of various beamwidths regardless of the number of antennas, a beam gain fluctuation may occur within target beam coverage. The beam gain fluctuation, which means that the beam gain is not constant within the beam coverage, may degrade the minimum beam gain, resultantly worsening the beam training performance. Due to beam fluctuations that intensify as the number of antennas increases, it may be difficult to operate beams while changing beamwidths in a high frequency band. As a result, as the number of antennas increases, beam training overhead may increase.

The methods and devices according to various embodiments of the disclosure may provide a codebook for mitigating beam fluctuations and generating beams of various beamwidths and may reduce beam fluctuations occurring when generating beams of various beamwidths.

According to an embodiment, a method performed by a base station supporting beam training using a beamforming codebook may comprise storing a plurality of codebooks corresponding to a plurality of different beamwidths, receiving a beam adjustment request from a user equipment (UE), determining, among the plurality of codebooks, a codebook including beam codebooks for beam coverages including a beamwidth corresponding to a channel state of the UE, in response to receiving the beam adjustment request, and transmitting, to the UE, signals that are beamformed based on the codebook through a plurality of transmission beams using digital beamforming matrixes of the codebook. Each beam codebook $q_m$ of the beam codebooks included in the codebook may be configured based on a product of a transmission analog beamforming matrix and a baseband digital processing vector that are obtained based on a beam codeword $v_m$ for an m-th beam coverage, and the beam codeword $v_m$ may obtained based on a beam gain vector $[g_m]_k$ corresponding to a k-th over-sampled angle of departure (AoD) and an array steering matrix A.

According to an embodiment, a method performed by a user equipment (UE) performing beam training using a beamforming codebook may comprise storing a plurality of codebooks corresponding to a plurality of different beamwidths, transmitting a beam adjustment request to a base station, determining, among the plurality of codebooks, a codebook including beam codebooks for beam coverages including a beamwidth corresponding to a channel state of the UE based on the beam adjustment request, and performing beam training based on receiving signals that are beamformed through a plurality of transmission beams from the base station using digital beamforming matrixes of the codebook. Each beam codebook $q_m$ of the beam codebooks included in the codebook may be configured based on a product of a transmission analog beamforming matrix and a baseband digital processing vector that are obtained based on a beam codeword $v_m$ for an m-th beam coverage, and the beam codeword $v_m$ may obtained based on a beam gain vector $[g_m]_k$ corresponding to a k-th over-sampled angle of departure (AoD) and an array steering matrix A.

According to an embodiment, a device of a base station supporting beam training using a beamforming codebook comprises a transceiver and a controller operable connected with the transceiver, the controller configured to store a plurality of codebooks corresponding to a plurality of different beamwidths, receive a beam adjustment request from a user equipment (UE), determine, among the plurality of codebooks, a codebook including beam codebooks for beam coverages including a beamwidth corresponding to a channel state of the UE, in response to receiving the beam adjustment request, and transmit, to the UE, signals that are beamformed based on the codebook through a plurality of transmission beams using digital beamforming matrixes of the codebook. Each beam codebook $q_m$ of the beam codebooks included in the codebook may be configured based on a product of a transmission analog beamforming matrix and a baseband digital processing vector that are obtained based on a beam codeword $v_m$ for an m-th beam coverage, and the beam codeword $v_m$ may obtained based on a beam gain vector $[g_m]_k$ corresponding to a k-th over-sampled angle of departure (AoD) and an array steering matrix A.

According to an embodiment, a device of a user equipment (UE) performing beam training using a beamforming codebook comprises a transceiver and a controller operable connected with the transceiver, the controller configured to store a plurality of codebooks corresponding to a plurality of different beamwidths, transmit a beam adjustment request to a base station, determine, among the plurality of codebooks, a codebook including beam codebooks for beam coverages including a beamwidth corresponding to a channel state of the UE, based on the beam adjustment request, and perform beam training based on receiving signals that are beamformed through a plurality of transmission beams from the base station using digital beamforming matrixes of the codebook. Each beam codebook $q_m$ of the beam codebooks included in the codebook may be configured based on a product of a transmission analog beamforming matrix and a baseband digital processing vector that are obtained based on a beam codeword $v_m$ for an m-th beam coverage, and the beam codeword $v_m$ may obtained based on a beam gain vector $[g_m]_k$ corresponding to a k-th over-sampled angle of departure (AoD) and an array steering matrix A.

According to various embodiments, a codebook for beam training is designed to mitigate beam gain fluctuation in beam coverage in sub-THz or THz communication systems, and a beam training scheme is provided based on the codebook. Thus, it is possible to more efficiently and precisely perform beam training and beamforming communication than codebook and beam training according to the prior art.

According to various embodiments, it is possible to increase efficiency and accuracy of beam training in sub-THz and THz by reducing beam training overhead.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5A, 5B, and FIG. 5C illustrate flexible beam training according to an embodiment of the present disclosure;

FIGS. 6A and 6B illustrate cell-specific beam adjustment for flexible beam training according to an embodiment of the present disclosure;

DETAILED DESCRIPTION

Figure 1A:
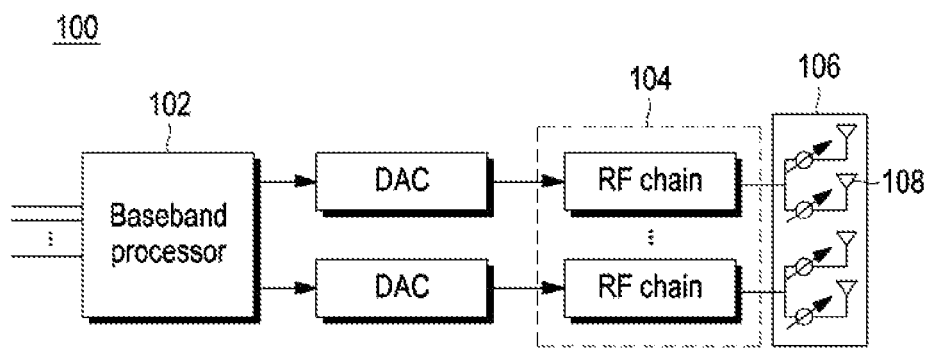
FIG. 1A is a block diagram illustrating a transmission device including a hybrid beamforming structure according to an embodiment of the present disclosure.

FIGS. 1A through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure are described in detail with reference to the accompanying drawings.

In describing the embodiments, the description of technologies that are known in the art and are not directly related to the disclosure is omitted. This is for further clarifying the gist of the disclosure without making it unclear.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims.

The same reference numeral denotes the same element throughout the specification. When determined to make the subject matter of the disclosure unclear, the detailed description of the known art or functions may be skipped. The terms as used herein are defined considering the functions in the disclosure and may be replaced with other terms according to the intention or practice of the user or operator. Therefore, the terms should be defined based on the overall disclosure.

In the disclosure, the base station may be an entity allocating resource to terminal and may be at least one of gNode B (gNB), eNode B (eNB), Node B, base station (BS), artificial satellite, wireless access unit, base station controller, or node over network. The base station may be a gNB that provides network access to UE(s) through a network of backhaul and access links in a 5G system (NR system).

The terminal may include a user equipment (UE), a mobile station (MS), a cellular phone, a smart phone, a computer, or a multimedia system capable of performing a communication function. In the disclosure, downlink (DL) refers to a wireless transmission path of signal transmitted from the base station to the terminal, and uplink (UL) refers to a wireless transmission path of signal transmitted from the terminal to the base station. Although LTE or LTE-A systems may be described below as an example, the embodiments may be applied to other communication systems having a similar technical background or channel pattern. For example, 5G mobile communication technology (5G, new radio, or NR) developed after LTE-A may be included therein, and 5G below may be a concept including legacy LTE, LTE-A and other similar services. Further, the embodiments may be modified in such a range as not to significantly depart from the scope of the disclosure under the determination by one of ordinary skill in the art and such modifications may be applicable to other communication systems.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or subunits. Further, an element or a 'unit' may be implemented to reproduce one or more CPUs in a device or a security multimedia card. According to embodiments, a " . . . unit" may include one or more processors.

FIG. 1A is a block diagram illustrating a transmission device including a hybrid beamforming structure according to an embodiment of the present disclosure. As an example, the illustrated hybrid beamforming structure may be implemented in a transmission device of a communication system, e.g., a base station or a UE.

Referring to FIG. 1A, a transmission device 100 may include a baseband processor 120, at least two radio frequency (RF) chains 104, and a plurality of analog beamformers 106 connected to the RF chains 104. According to an embodiment, a large number of transmit antennas 108 may be connected to the analog beamformers 106 for mmWave, sub-THz, or THz. According to an embodiment, the antennas 108 may be an array antenna (or antenna array). In the disclosure, some of the antennas 108, connected to one RF chain, may be referred to as an antenna sub-array, and each antenna sub-array may include a plurality of antenna elements.

According to an embodiment, the baseband processor 120 may include a baseband digital precoder and at least two digital chains. The baseband digital precoder may precode transmission information by means of a baseband digital processing vector. As an example, the precoded signals may undergo inverse fast Fourier transform and parallel-to-serial conversion in the digital chains and may be output from the baseband processor 120. The outputs of the baseband processor 120 may be transferred to the at least two RF chains 104 via the digital-to-analog converters (DACs), as an example.

According to an embodiment, each RF chain 104 may include at least one band pass filter, at least one amplifier, at least one attenuator, and/or at least one mixer, and may generate an RF signal corresponding to the operation frequency band.

The RF signal output from one RF chain 104 may be input to at least two analog beamformers 106. Each analog beamformer 106 may include a phase shifter, a power amplifier (PA), and an antenna subarray 108, and may generate a signal beamformed by an analog beamforming matrix that determines the phase shift value of the phase shifter. According to an embodiment, the antenna sub-array 108 may be configured in a uniform linear array structure. The antenna sub-array 108 corresponding to each RF chain in the THz frequency band may include a large number of antenna elements.

Figure 1B:
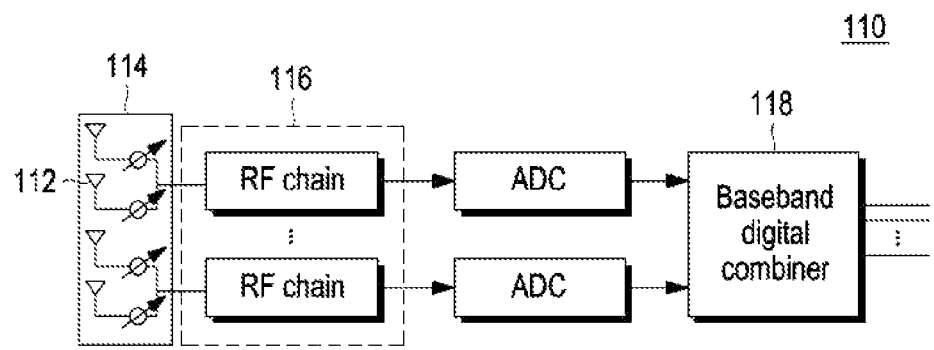
FIG. 1B is a block diagram illustrating a reception device including a hybrid beamforming structure according to an embodiment of the present disclosure.

FIG. 1B is a block diagram illustrating a reception device including a hybrid beamforming structure according to an embodiment of the present disclosure. As an example, the illustrated hybrid beamforming structure may be implemented in a transmission device of a communication system, e.g., a base station or a UE.

Referring to FIG. 1B, a reception device 110 may include a plurality of analog beamformers 114, a plurality of RF chains connected to the analog beamformers 114, and a baseband digital combiner 118. According to an embodiment, a large number of receive antennas 112 may be connected to the analog beamformers 114 for mmWave, sub-THz, or THz. According to an embodiment, the antennas 112 may be an array antenna (or antenna array). In the disclosure, some of the antennas 112, connected to one RF chain, may be referred to as an antenna sub-array, and each antenna sub-array may include a plurality of antenna elements.

According to an embodiment, the analog beamformers 114 each may include an antenna subarray 112, a low noise amplifier (LNA), and a phase shifter, and form a plurality of reception beam coverages by controlling the phase shift value of the phase shift by an analog beamforming matrix that may be used in the transmission device (e.g., the transmission device 100 of FIG. 1A)). The RF chains 116 may include at least one band pass filter, at least one amplifier, at least one attenuator, and/or at least one mixer, and may convert the RF signals input from the analog beamformers 114 into baseband signals.

The baseband signals may be transferred to the baseband digital combiner 118 via the analog-to-digital converters (ADCs), as an example. The baseband digital combiner 118 may reconstruct the transmission information by combining the baseband signals by a baseband digital processing vector that may be used in the transmission device (e.g., transmission device 100 of FIG. 1A).

In the following description, the terms "beam," "beam coverage," "beam codeword," and "beamforming vector" may be used interchangeably.

Beamforming technology for utilizing spatial resources in a mobile communication system requires beam training for a channel and an appropriate beam between the UE and the base station. In a communication system, such as LTE or NR, beam training may be performed using analog beams. In a system using analog beams, the beamwidth may be determined as in Equation 1 below according to the number of antennas. Here, $\Delta\varphi_{3dB}$ denotes a beamwidth of 3 dB, and N denotes the number of transmit antennas:

$$\Delta\varphi_{3dB} = \frac{1.772}{N}. \qquad \text{[Equation 1]}$$

The codebook for hybrid precoding is based on over-complete dictionary beam gains. In this case, the over-complete dictionary beam gain vector may be intuitively generated to have a magnitude of 1 or 0. The following Equation 2 represents the k-th element constituting an over-complete dictionary beam gain vector $g_m$ for the m-th beam coverage:

$$[g_m]_k = g_m(\phi_k) = |G(v_m, \phi_k)| = \begin{cases} 1, & \phi_k \in I_m \\ 0, & \phi_k \notin I_m \end{cases} \qquad \text{[Equation 2]}$$

where $I_m$ denotes the m-th beam coverage, and $v_m$ denotes the beam codeword (i.e., the beamforming vector) for forming the m-th beam coverage. In other words, the total service coverage of the transmission device is split into M beam coverages, and each beam coverage may mean an area covered by a corresponding beam. Here, $G(v_m, \phi_k)$ means the beam gain for $\phi_k$ when the beamforming vector $v_m$ is used, $g_m(.)$ means a vector containing $G(\ )$, and $G(v_m, \phi_k)$ becomes the k-th component of $g_m(\ )$.

$\phi_k$ means the k-th AoD among over-sampled angles of departure (AoDs). For example, each beam coverage that may be within the range of [0 degrees, 180 degrees] is sampled by K AoDs, and each sampled AoD may be expressed as in Equation 3 below:

$$\phi_k = \frac{\pi}{2}(-1 + (2k-1)/K), k = 1, 2, \ldots, K, K \geq N. \qquad \text{[Equation 3]}$$

Therefore, the beam codeword $v_m$ for forming the m-th beam coverage may be obtained as in the following Equation 4:

$$\hat{v}_m = \underset{v_m}{\operatorname{argmin}} \left\| A^H v_m - g_m \right\|_2^2 \qquad \text{[Equation 4]}$$

where A denotes the array steering matrix.

Figure 2A:
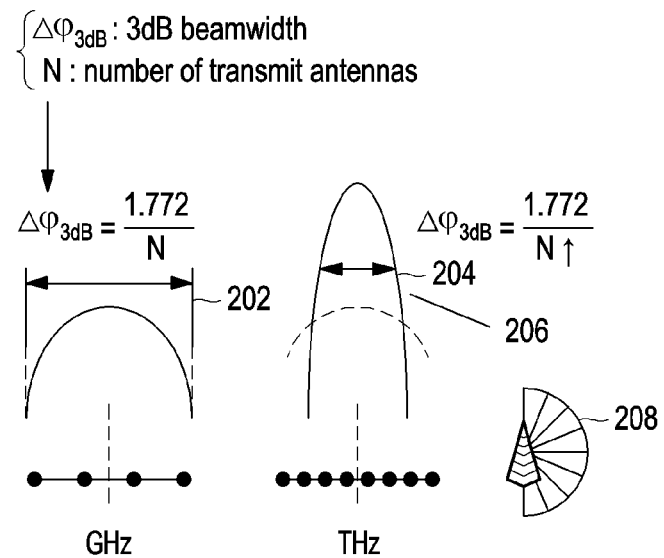
FIG. 2A and FIG. 2B illustrate beam fluctuations when an analog beamforming-based codebook is used.
Figure 2B:
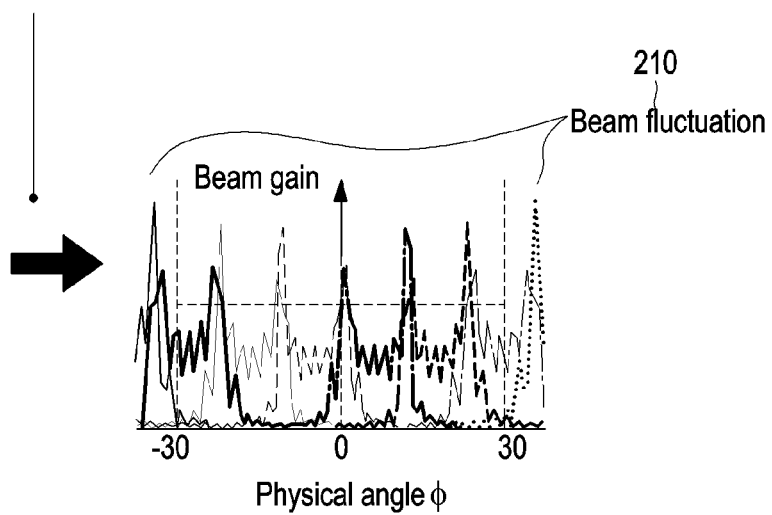

FIG. 2A and FIG. 2B illustrates beam fluctuations when an analog beamforming-based codebook is used.

FIG. 2A illustrates comparison between a beamwidth 202 of a GHz frequency band and a beamwidth 204 of a THz frequency band. Referring to FIG. 2A, the beamwidth 202 of the GHz frequency band and the beamwidth 204 of the THz frequency band each may be determined according to the number of transmit antennas. Since a large number of transmit antennas are used for beam gain in the THz frequency band, the beamwidth 204 of the THz frequency band is relatively small compared to the beamwidth 202 of the GHz frequency band. Thus, the base station 208 is required to use more beams than the GHz frequency band so as to form a broadband beam in the THz frequency band and may thus have difficulty in operating beamforming in the THz frequency band.

FIG. 2B illustrates the beam gain at a physical angle ranging from −30 degrees to 30 degrees for a plurality of beam coverages. As shown, the beam gain at the center (0 degrees) is smaller than the beam gains at the edges (e.g., −30 degrees/30 degrees) and, within the target beam coverage (e.g., a range from −30 degrees to 30 degrees), degradation of the minimum beam gain and a beam gain fluctuation 210 occur.

The disclosed embodiments may design a beam training codebook capable of forming beams of various beamwidths while mitigating a beam gain fluctuation within beam coverage in hybrid precoding-based beamforming.

A transmission device (e.g., transmission device 100) including an antenna subarray including S antenna elements and R RF chains (e.g., the RF chains 104) may divide the full beam coverage (e.g., the service coverage of the transmission device 100) into M beam coverages and perform beam transmission.

A beam codeword for the m-th beam coverage for a uniform linear array antenna capable of forming beams of various beamwidths while mitigating the beam gain fluctuation may be obtained as illustrated in Equation 5 below:

$$v_m = \frac{(AA^H)^{-1} A \hat{g}_m}{\left\| (AA^H)^{-1} A \hat{g}_m \right\|_2}. \qquad \text{[Equation 5]}$$

According to an embodiment, the total number of antenna elements of the transmission device 100 is N=RS, and each beam may support a coverage of n/M.

$v_m$ obtained as in Equation 5 is the beam codeword for forming the m-th beam coverage, A denotes the array steering matrix, and $g_m$ denotes the beam gain vector for the m-th beam coverage.

According to an embodiment, A may be defined as in Equation 6 below:

$$A = \sqrt{N}[a(N,\phi_1)a(N,\phi_2) \ldots a(N,\phi_K)]. \qquad \text{[Equation 6]}$$

Here, $\phi_k$ which means the k-th AoD (k=1, 2, . . . , K) within the beam coverage may be obtained as in Equation 3 described above. The array steering vector a constituting the array steering matrix may be obtained as in Equation 7 below for the number N of transmit antennas and each AoD. It should be noted that in the following Equation 7, the subscript k meaning the k-th AoD is omitted:

$$a(N, \phi) = \frac{1}{\sqrt{N}}[1, \; e^{j\pi\phi} \; \ldots \; e^{j(N-1)\pi\phi}]^T. \qquad \text{[Equation 7]}$$

According to an embodiment, the beam gain vector $g_m$ for the m-th beam coverage and the k-th AoD in Equation 5 may be obtained as in Equation 8 below. The superscript "hat" means that the following beam gain vector has been estimated:

$$[\hat{g}_m]_k = \frac{1}{T(a_k)} \exp\left[-j\frac{(N-1)\pi a_k}{2}\right], k \in \{1, 2, \ldots, K\}. \quad \text{[Equation 8]}$$

Here, T(m) means the amplitude factor of the beam gain vector for mitigating a beam gain fluctuation within the m-th beam coverage, and $a_k$ means the phase factor for increasing the degree of freedom of the beam gain vector.

According to an embodiment, T(m) may be obtained as illustrated in Equation 9 below for the beam index m and the number N of transmit antennas:

$$T(m) = \frac{\sin(\pi Nm/2)}{\sin(\pi m/2)}. \quad \text{[Equation 9]}$$

According to an embodiment, $a_k$ may be obtained as in Equation 10 below for the k-th AoD, the beam index m, and the number M of beam coverages:

$$a_k = \sin(\phi_k) - \sin\left(-\frac{\pi}{2} + \frac{\pi(2m-1)}{2M}\right). \quad \text{[Equation 10]}$$

According to an embodiment, the cell coverage of the base station is split into M beam coverages, and each beam coverage (i.e., m-th beam coverage) may be covered by a corresponding beam (i.e., the m-th beam).

To use the beam codeword $v_m$ obtained through the above-described operations in a hybrid precoding-based beamforming system (e.g., the transmission device 100 of FIG. 1A), a baseband digital processing vector for the baseband processor 102 and a transmission analog beamforming matrix for the analog beamformers 106 may be obtained.

According to an embodiment, a beam codebook $q_m$ (that is, beamforming vector) for forming the m-th beam coverage considering the antenna structure may be obtained as in Equation 11 below:

$$q_m = W_m f_m \quad \text{[Equation 11]}$$

where $W_m$ means the transmission analog beamforming matrix used by the analog beamformers 106 to form the m-th beam coverage, and may be configured as illustrated in Equation 12 below:

$$W = \begin{bmatrix} w_1 & 0 & \cdots & 0 \\ 0 & w_2 & \cdots & 0 \\ \vdots & \vdots & \ddots & \vdots \\ 0 & 0 & \cdots & w_R \end{bmatrix} \text{with} \quad \text{[Equation 12]}$$

$$w_r = [w_{r,1}, w_{r,2}, \ldots, w_{r,S}].$$

In Equation 12, the beam index m is omitted. In other words, the transmission analog beamforming matrix for forming the m-th beam coverage includes R transmission analog beamforming vectors individually corresponding to the R RF chains, and each transmission analog beamforming vector may include S elements corresponding to S antenna elements.

In Equation 11, $f_m$ means the baseband digital processing vector used in the baseband processor 102 to form the m-th beam coverage, and may be configured as illustrated in Equation 13 below:

$$f = [f_1, f_2, \ldots, f_R]. \quad \text{[Equation 13]}$$

In Equation 13, the beam index m is omitted. In other words, the baseband digital processing vector for forming the m-th beam coverage may include R baseband digital processing elements individually corresponding to R RF chains, and $f_r$ which is outputted from the digital processor 102 and inputted to the r-th RF chain may be obtained as in Equation 14 below:

$$f_r = w_r^* p_r$$

$$p_r [[v_m]_{(r-1)S+1} [v_m]_{(r-1)S+2} \cdots [v_m]_{rS}]^T, r \in \{1, 2, \ldots, R\} \quad \text{[Equation 14]}$$

where $w_r$ is as shown in <Equation 12>, and $[v_m]_x$ means the x-th element of the beam codeword vm for the m-th beam coverage.

Due to practical issues, the analog beamformers 106 may include quantized phase shifters. According to an embodiment, each phase shifter may be configured to have a phase shift value of a predetermined number of bits (e.g., 6 bits) of a quantized phase shift set.

Accordingly, considering the structure of the quantized phase shifter, a phase shift matching operation for adjusting the phase of the beam codeword obtained through Equation 5 may be performed. According to an embodiment, the phase shift mapping operation may be performed by Equation 15 and Equation 16 as follows:

$$\hat{\phi}_{r,s} = \operatorname*{argmin}_{\phi \in \Phi} |\phi - \text{Im}\{[v_m]_{rS+s}\}|^2, \quad \text{[Equation 15]}$$

$$1 \leq r \leq R, 1 \leq s \leq S; \text{and}$$

$$[w_r]_s = w_{r,s} = \frac{1}{\sqrt{S}} e^{j\hat{\phi}_{r,s}}, 1 \leq r \leq R, 1 \leq s \leq S. \quad \text{[Equation 16]}$$

Here, $\Phi$ means the quantized phase shift set.

In other words, the transmission analog beamforming vector $w_r$ constituting $W_m$ in Equation 11 may be obtained as in Equation 15 and Equation 16.

The beam codebook (e.g., Equation 11) obtained through the above procedure is applicable to beam training for various (N, M). According to an embodiment, the above-described beam codebook may be applied to antennas with a uniform planar array structure or a three-dimensional (3-D) coverage.

Conventional techniques determine the over-complete dictionary beam gain vector $g_m$, e.g., as in Equation 2, in designing a beam codeword for the m-th beam coverage. The embodiments may adjust the beam gain vector to mitigate the beam gain fluctuation.

According to an embodiment, the beam gain vector may be obtained to meet the following Equation 17 to make the beam gains even within the beam coverage:

$$\max_{g_m} \sum_{\phi_k \in I_m} U(G_k) \quad \text{[Equation 17]}$$

where $G_k$ means the beam gain for the angle $\phi_k$, and U means the utility function for a utility proportional fairness approach.

According to an embodiment, the utility function may be a logarithm function. When the log function is applied, Equation 18 below may be used instead of Equation 17:

$$\max_{g_m} \sum U_k(G_k) \Rightarrow \max_{g_m} \sum_{\phi_k \in I_m} \log |a(N, \phi_k)^H (AA^H)^{-1} A g_m|. \quad \text{[Equation 18]}$$

By applying Equation 17, the above-described beam codebook may be obtained.

According to an embodiment, the beam codebook for beam training may be obtained by substituting gm, which is obtained to maximize the sum of the utility functions of Equation 17 (or Equation 18), in Equation 5. According to an embodiment, the codebook for beam training may be obtained through Equation 11 to Equation 16 considering the practical issues based on $v_m$ obtained through Equation 5.

Figure 3A:
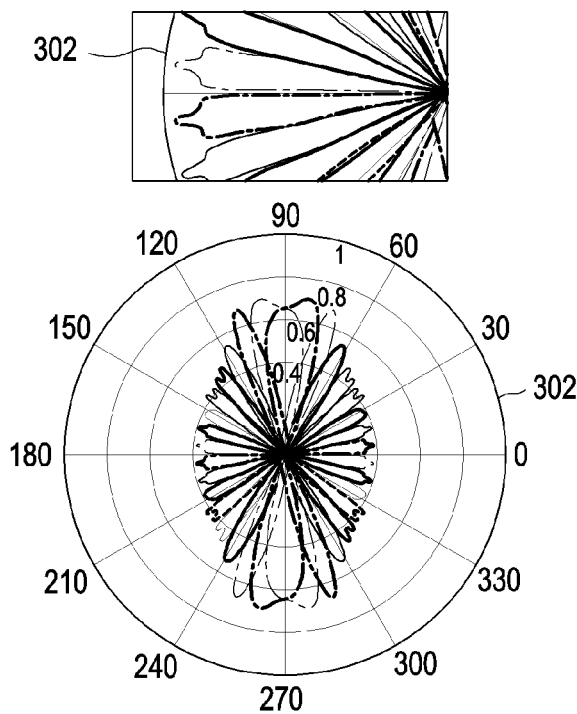
FIGS. 3A, 3B, and FIG. 3C illustrate comparison in beam gain between an embodiment and the conventional art.
Figure 3B:
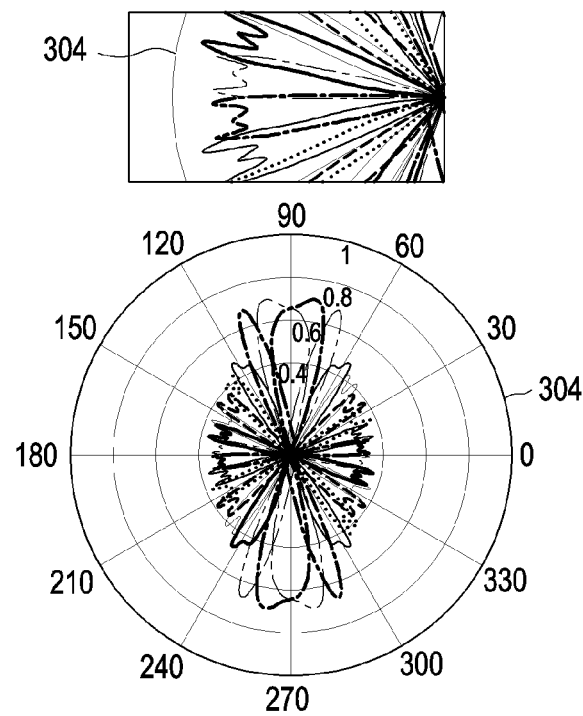
Figure 3C:
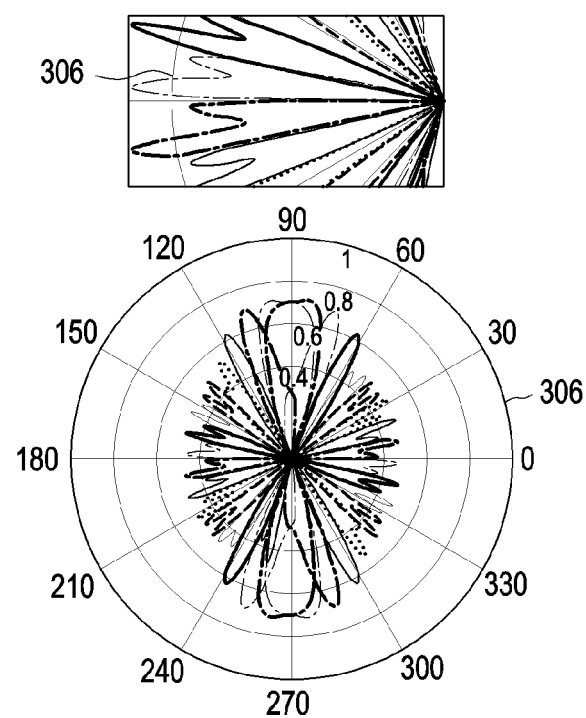

FIGS. 3A, 3B, and FIG. 3C illustrate comparison in beam gain between an embodiment and the conventional art. Here, (R, S, M)=(8, 32, 16), and FIGS. 3A, 3B, and 3C are diagrams of the beam gain when 6-bit quantized phase shift is applied.

Reference numeral 302 of FIG. 3A denotes changes in beam gain according to angles when beam codewords targeting their respective beam coverages are used, in a case where an embodiment is applied. Similarly, reference numeral 304 of FIG. 3B and reference number 306 of FIG. 3C denote changes in beam gain according to angles when beam codewords targeting their respective beam coverages are used, in a case where two conventional techniques are applied. As shown, it may be identified that the beam gain change denoted with reference numeral 302 has the largest minimum value of beam gain in the beam coverage as compared with reference numerals 304 and 306. The results of such a performance test may show that the embodiments mitigate the fluctuation of beam gain.

Figure 4:
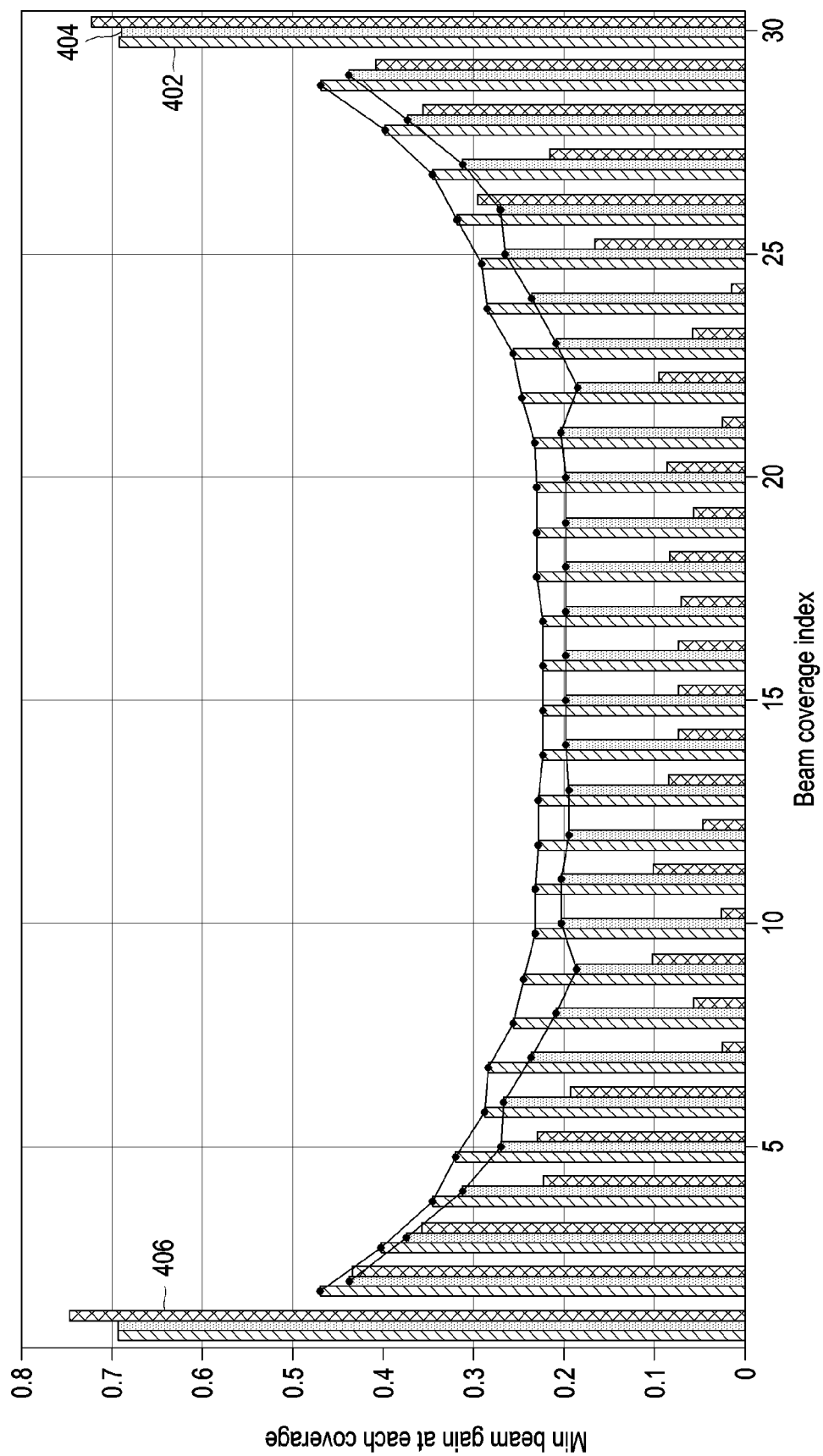
FIG. 4 illustrates comparison in beam gain between an embodiment and the conventional art according to beam coverage indexes.

FIG. 4 illustrates comparison in beam gain between an embodiment and the conventional art according to beam coverage indexes. Here, (R, S, M)=(16, 16, 30), and FIG. 4 is a diagram of the beam gain when 6-bit quantized phase shift is applied.

Reference numeral 402 in FIG. 4 denotes a beam gain according to an embodiment, and reference numeral 404 and reference numeral 406 denote beam gains according to two conventional techniques. As shown, it may be identified that the beam gain indicated by reference numeral 402 has a higher minimum beam gain in most of the beam coverages.

Table 1 and Table 2 below show comparison in beam gain performance between the embodiments and conventional techniques. The results of comparison performed based on the minimum and average values of the beam gain within the beam coverage are included, and the beam gain performance is evaluated according to various (R, S, M). Table 1 and Table 2 show the beam gain performance (i.e., the minimum value and the average value) evaluated while changing R for a fixed S (S=16), and Table 3 and Table 4 show the beam gain performance (i.e., the minimum value and the average value) evaluated while changing S for a fixed R (R=4).

TABLE 1

| Beam gain performance | | |
|---|---|---|
| Min. | R = 8 | R = 16 |
| Beam gain relative to the Prior Art (404) (dB) | 0.29 | 1.16 |
| Beam gain relative to the Prior Art (406) (dB) | 1.12 | 8.31 |

TABLE 2

| Beam gain performance | | |
|---|---|---|
| Avg. | R = 8 | R = 16 |
| Beam gain relative to the Prior Art (404) (dB) | 0.71 | 0.73 |
| Beam gain relative to the Prior Art (406) (dB) | −0.91 | −0.47 |

TABLE 3

| Beam gain performance | | |
|---|---|---|
| Min. | R = 32 | R = 64 |
| Beam gain relative to the Prior Art (404) (dB) | 3.10 | 9.58 |
| Beam gain relative to the Prior Art (406) (dB) | 0.68 | 5.36 |

TABLE 4

| Beam gain performance | | |
|---|---|---|
| Avg. | R = 32 | R = 64 |
| Beam gain relative to the Prior Art (404) (dB) | 2.20 | 2.96 |
| Beam gain relative to the Prior Art (406) (dB) | −1.03 | −2.09 |

As shown in Table 1 to Table 4, if the beam codebook according to an embodiment is used, the average value of the beam gain within the beam coverage somewhat decreases, but the minimum value increases. Such a tendency is shown in Table 1 to Table 4, and it may thus be identified that the beam codebook according to an embodiment effectively mitigates the beam gain fluctuation. In particular, as the number of antenna elements increases, the minimum value of a beam gain within beam coverage may be increased compared to the prior art. Therefore, the embodiments may effectively mitigate the beam gain fluctuation in sub-THz and THz in which a large number of antenna elements are used.

The higher the frequency band, the higher the path loss, so a large number of antenna elements may be required. For this reason, the prior art has no choice but to utilize beams with a narrow beamwidth, and has a high beam training overhead. Therefore, if using a beam codebook according to an embodiment in which the minimum beam gain is guaranteed for an arbitrary number of antennas and beam coverage, it would be possible to increase the performance of the beam training and reduce the overhead based on the multi-beam system.

The flexible beam training may flexibly determine the beamwidth considering the channel state of the UE(s) and reduce the beam training overhead.

Figure 5A:
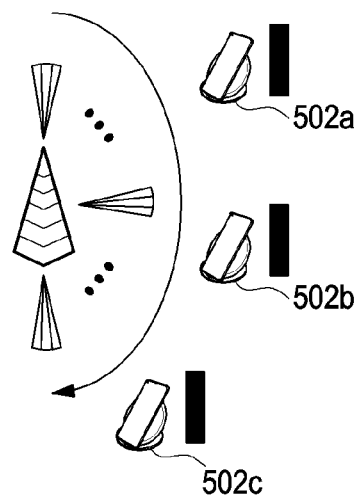
Figure 5B:
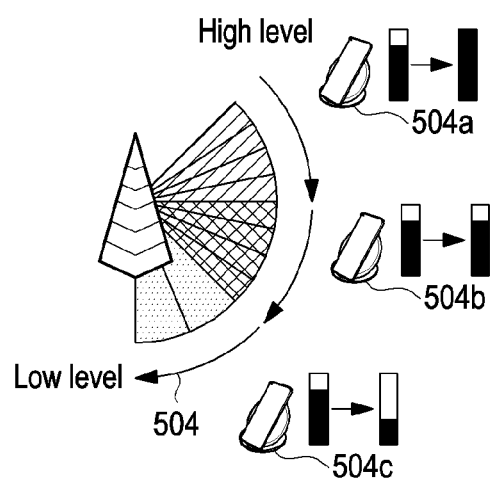

FIGS. 5A, 5B, and FIG. 5C illustrate flexible beam training according to an embodiment.

The transmission device of FIG. 5A may transmit beams 502 having a fixed beamwidth determined according to the number of antennas. Each beam 502 may form a beam coverage having the beamwidth. According to an embodiment, in the case of initial beam training, the transmission device may transmit the beams 502 using a fixed beamwidth without considering the cell state and the states of UEs 502a, 502b, and 502c. All of the UEs 502a, 502b, and 502c may receive the beams 502 having a high beam gain, but the beam training may take a long time and the beam training overhead may be high.

The transmission device of FIG. 5B may transmit beams 504 having a flexible beamwidth according to the state (e.g., channel state, or received signal quality) of the UEs 504a, 504b, and 506c. Beams of a narrow beamwidth (e.g., formed by a high-level beam codebook) may be transmitted to a UE (e.g., the UE 504a) having a channel state of relatively poor signal quality, and the UE 504a may obtain a high beam gain. Beams of a wide beamwidth (e.g., formed by a low-level beam codebook) may be transmitted to a UE (e.g., UE 504c) having a channel state of relatively good signal quality, and UE 504c may obtain a low beam gain. Accordingly, it is possible to reduce the beam training overhead for the UEs 504a, 504b, and 504c.

The transmission device of FIG. 5C may broaden or sharpen each beamwidth depending on the channel state of the UEs 504a, 504b, and 504c. When the channel state of the UE 504a becomes better, the transmission device may apply a wider beamwidth 506a to the UE 504a. When the channel state of the UE 504c becomes worse, the transmission device may apply a narrower beamwidth 506c to the UE 504c. The same beamwidth 506b may be maintained for the UE 504b in which the channel state is maintained.

According to an embodiment, flexible beam training may be performed through cell-specific beam adjustment and/or user-specific beam adjustment.

Cell-specific beam adjustment may include operations for determining the beamwidth regardless of whether the UE is in a connected state and performing beam training. Unlike the prior art that uses a fixed beamwidth depending on the number of antennas, the cell-specific beam adjustment may use a wide beamwidth without limitations to the number of antennas and may thus reduce beam training overhead.

FIGS. 6A and 6B illustrate cell-specific beam adjustment for flexible beam training according to an embodiment.

Referring to FIG. 6A, in the prior art that does not use cell-specific beam adjustment, beams of a fixed beamwidth that may be determined depending on the number of antennas may be transmitted (i.e., beam sweeping) from the transmission device, and the UEs in the cell may perform beam training using the beams of the fixed beamwidth.

Referring to FIG. 6B, the transmission device supporting cell-specific beam adjustment may determine an adjustable beamwidth considering the cell state (e.g., base station load) and transmit beams having the adjusted beamwidth to thereby support beam training of UEs. Unlike the prior art (e.g., FIG. 6A) that uses a fixed beamwidth that may be determined depending on the number of antennas, the cell-specific beam adjustment may use a wide beamwidth depending on the cell state, without limitations to the number of antennas and may thus reduce beam training overhead.

According to an embodiment, user-specific beam adjustment may include operations for determining a beamwidth for a connected UE and performing beam training. User-specific beam adjustment may reduce the beam training overhead by adjusting the beamwidth based on the state (e.g., channel state) of the UE.

Figure 7:
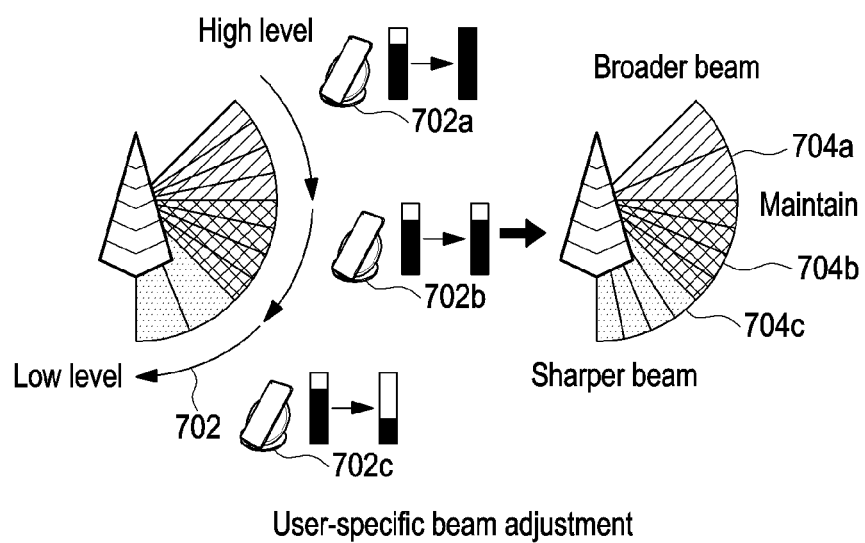
FIG. 7 illustrates user-specific beam adjustment for flexible beam training according to an embodiment of the present disclosure.

FIG. 7 illustrates user-specific beam adjustment for flexible beam training according to an embodiment of the present disclosure.

Referring to FIG. 7, the transmission device may transmit beams 702 having a flexible beamwidth depending on the state (e.g., channel state or received signal quality) of connected UEs 702a, 702b, and 702c. Beams of a narrow beamwidth may be transmitted to a UE (e.g., the UE 702a) having poor signal quality, and beams of a wide beamwidth may be transmitted to a UE (e.g., the UE 702c) having good signal quality.

When the signal quality of the UE 702a becomes better, the transmission device may apply a beam codebook having a wider beamwidth 704a to the UE 702a. When the signal quality of the UE 702c becomes worse, the transmission device may apply a beam codebook having a narrower beamwidth 704c to the UE 702c. The same beamwidth 704b may be applied to the UE 702b in which the channel state is maintained.

Figure 8A:
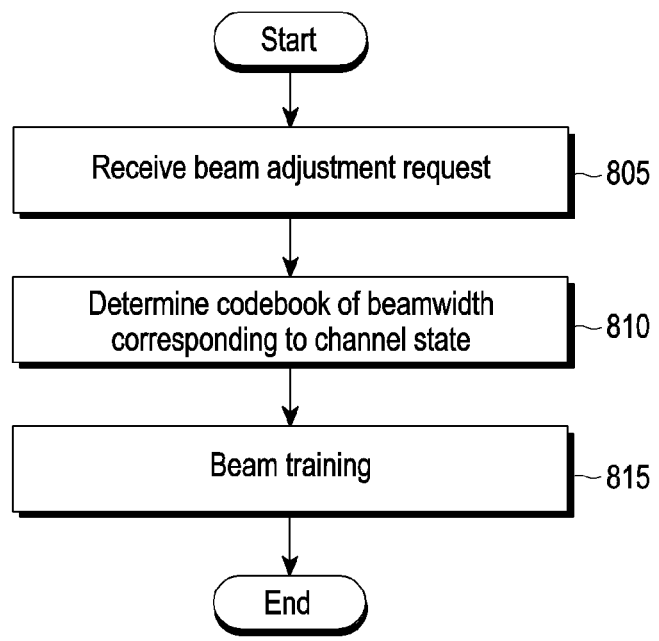
FIG. 8A is a flowchart illustrating operations of a base station supporting beam training according to an embodiment of the present disclosure.

FIG. 8A is a flowchart illustrating operations of a base station supporting beam training according to an embodiment of the present disclosure. According to an embodiment, a base station may include a transceiver, including the transmission device 100 of FIG. 1A, and a controller.

Referring to FIG. 8A, in operation 805, the base station may receive a beam adjustment request from a UE. According to an embodiment, the beam adjustment request may include information for the channel state of the UE. According to an embodiment, the beam adjustment request may include information indicating a desired beam quality of the UE.

In operation 810, the base station may determine a codebook of a beamwidth corresponding to the channel state of the UE. According to an embodiment, the base station may store a plurality of codebooks corresponding to a plurality of beamwidths. According to an embodiment, each codebook may include beam codewords that may be calculated by at least one of Equation 5 to Equation 18. According to an embodiment, each codebook may be generated for a value given for the number M of beam coverages. By adjusting M, the plurality of codebooks may include beam codewords of different beamwidths.

In operation 815, the base station may form transmission beams using the beam codewords of the at least one determined codebook and transmit, i.e., beam sweep, the transmission beams. According to an embodiment, the base station may form transmission beams using a plurality of codebooks individually corresponding to the channel conditions of a plurality of UEs. Each UE may train (or track) and measure the transmission beams of the base station using the same codebook as that used by the base station and may determine an appropriate beam for communication with the base station based on the result of measurement of the transmission beams. Information for the determined appropriate beam may be reported to the base station according to a predetermined procedure of beam training.

Figure 8B:
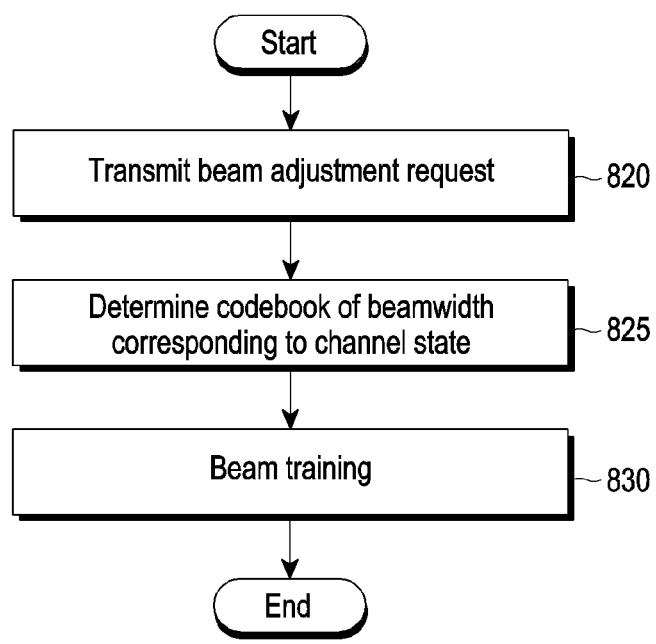
FIG. 8B is a flowchart illustrating an operation for a UE performing beam training according to an embodiment of the present disclosure.

FIG. 8B is a flowchart illustrating an operation for a UE performing beam training according to an embodiment of the present disclosure. According to an embodiment, a UE may include a transceiver, including the reception device 110 of FIG. 1B, and a controller, and may be configured to receive transmission beams transmitted from a base station including the transmission device 100 of FIG. 1A.

Referring to FIG. 8B, in operation 820, the UE may transmit a beam adjustment request signal to the base station. According to an embodiment, the beam adjustment request signal may include information for the channel state of the UE. According to an embodiment, the beam adjustment request may include information indicating a desired beam quality of the UE.

In operation 825, the UE may determine a codebook of a beamwidth corresponding to the channel state of the UE. According to an embodiment, the UE may predict that the base station stores a plurality of codebooks corresponding to a plurality of beamwidths, and may use a codebook of a beamwidth corresponding to the channel state of the UE among the plurality of codebooks. According to an embodiment, each codebook may include beam codebooks that may be calculated by at least one of Equation 5 to Equation 18. According to an embodiment, each codebook may be generated for a value given for the number M of beam coverages. By adjusting M, the plurality of codebooks may include beam codebooks of different beamwidths.

In operation 830, the UE may receive transmission beams formed by the base station using the beam codewords of the determined codebook. According to an embodiment, the UE may receive the transmission beams using a codebook corresponding to the channel state of the UE. According to an embodiment, the codebook may include beam codebooks for beam coverages having a beamwidth corresponding to the channel state of the UE. The UE may train (or track) and measure the transmission beams of the base station using the same codebook as that used by the base station and may determine an appropriate beam for communication with the base station based on the result of measurement of the transmission beams. Information for the determined appropriate beam may be reported to the base station according to a predetermined procedure of beam training.

According to an embodiment, in a scheme for requesting user-specific beam adjustment, a scheme for transmitting a beam adjustment request (BAR) or a scheme for transmitting a desired beam quality (DBQ) may be considered.

According to an embodiment, the BAR transmission scheme may determine whether to perform user-specific beam adjustment for each beam training. The UE periodically transmits a BAR signal, including 1 when beam adjustment is required, or 1 when beam adjustment is not required, to the base station and, for every transmission, may determine whether to perform beam training and adjust the beamwidth. According to an embodiment, the UE may perform beam training through a channel state information-reference signal (CSI-RS) or a synchronization signal block (SSB).

Figure 9:
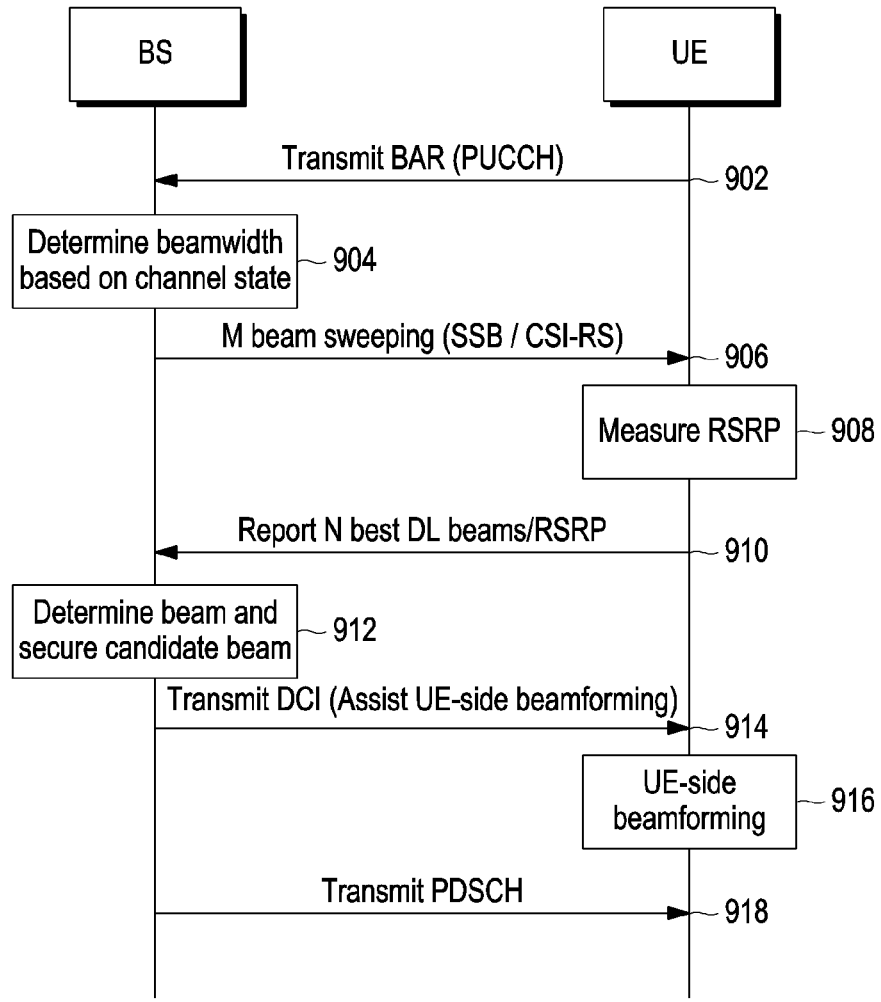
FIG. 9 is a flowchart illustrating a beam training procedure according to transmission of a BAR according to an embodiment of the present disclosure.

FIG. 9 is a flowchart illustrating a beam training procedure according to transmission of a beam adjustment request (BAR) according to an embodiment of the present disclosure.

Referring to FIG. 9, in operation 902, the UE may transmit a BAR signal to the base station. The BAR signal may include a value, e.g., 0 or 1, for the UE to request the base station to perform beam adjustment. According to an embodiment, the BAR signal may be transmitted through a physical uplink control channel (PUCCH) carrying uplink control signals or a physical uplink shared channel (PUSCH) carrying uplink packets.

In operation 904, the base station may determine a beamwidth (or the number M of beam coverages) for the UE based on the channel state of the UE. According to an embodiment, the channel state may be obtained through the channel quality information (channel state information (CSI)) transmitted from the UE or may be obtained through the BAR signal of operation 902, or may be obtained by other means. According to an embodiment, the base station may previously store or generate a plurality of codebooks corresponding to different beamwidths, generated using Equation 5 to Equation 18 described above, and determine a codebook having the beamwidth corresponding to the channel state of the UE among the plurality of codebooks.

In operation 906, the base station may transmit signals (e.g., SSB and/or CSI-RS), that may be used for beam training, through M (downlink) transmission beams (i.e., beam sweeping) generated according to the determined codebook.

In operation 908, the UE may receive the signals transmitted through the transmission beams from the base station, measure the received signal strength (e.g., reference signal received power (RSRP)) for each transmission beam, and evaluate each transmission beam based on the measured values.

In operation 910, the UE may report, to the base station, information for N best beams selected from among the M transmission beams. According to an embodiment, the UE may report the index and/or RSRP for the N beams to the base station.

In operation 912, the base station may determine the best beam and one or more candidate beams to be used for communication with the UE based on the report in operation 910. Determining the beams may mean determining a beam codebook corresponding to the corresponding beam. In operation 914, the base station may transmit downlink control information (DCI) including information for the determined best beam (optionally the candidate beams) to the UE. According to an embodiment, the DCI may include scheduling information indicating the resource scheduled for the UE. According to an embodiment, the DCI may include information supporting UE-side beamforming. The UE-side beamforming may include beam training for (uplink) transmission beams transmitted from the UE.

In operation 916, the UE may perform an operation for UE-side beamforming.

According to an embodiment, the UE-side beamforming may include the operations of performing beam sweeping through a plurality of uplink transmission beams by the UE and determining a codebook and an uplink transmission beam to be used in the UE based on feedback from the base station.

In operation 918, the base station may transmit a physical downlink shared channel (PDSCH) to the UE based on the scheduling information transmitted through the DCI in operation 914. According to an embodiment, the PDSCH may be transmitted using the beam and beam codebook determined in operation 912. The UE may receive the PDSCH based on information for the beam codebook obtained in DCI of operation 914.

According to an embodiment, the DBQ transmission scheme may perform multibeam-based beam training (e.g., hierarchical beam training) until the beam quality desired by the UE is met. CSI-RS/SSB may be flexibly utilized, and the beam density (i.e., beamwidth) and transmission period may be changed for every beam sweeping.

Figure 10:
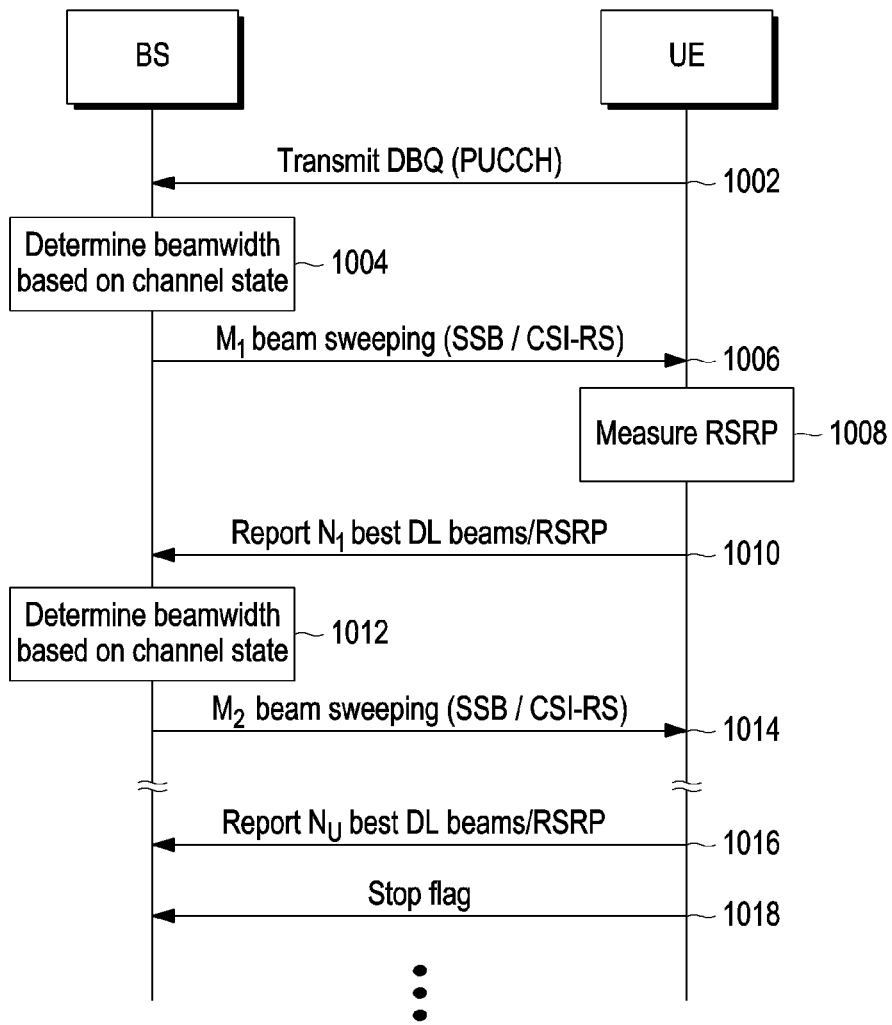
FIG. 10 is a flowchart illustrating a beam training procedure according to transmission of a DBQ according to an embodiment of the present disclosure.

FIG. 10 is a flowchart illustrating a beam training procedure according to transmission of a desired beam quality (DBQ) according to an embodiment of the present disclosure.

Referring to FIG. 10, in operation 1002, the UE may transmit a DBQ signal to the base station. The DBQ signal may include information for the desired beam quality for the UE to send a request for beam adjustment to the base station. According to an embodiment, the information for the desired beam quality may include a value of RSRP that the UE wants to receive.

In operation 1004, the base station may determine a beamwidth (e.g., the number $M_1$ of beam coverages) for the UE based on the desired beam quality received from the UE. According to an embodiment, the base station may determine a beamwidth corresponding to the desired beam quality of the UE according to a predetermined mapping rule.

According to an embodiment, the base station may determine whether to broaden or sharpen the current beamwidth for the UE with reference to the desired beam quality of the UE. According to an embodiment, the base station may previously store or generate a plurality of codebooks corresponding to different beamwidths, generated using Equation 5 to Equation 18 described above, and determine a codebook having the beamwidth determined for the UE among the plurality of codebooks.

In operation 1006, the base station may perform beam sweeping through $M_1$ (downlink) transmission beams generated according to the determined codebook. The beam sweeping may include the operation of transmitting SSB and/or CSI-RSs through the transmission beams. where $M_1$ means the number of beam coverages determined according to the determination in operation 1004.

In operation 1008, the UE may receive signals transmitted through $M_1$ transmission beams from the base station, measure the received signal strength (e.g., RSRP) of each transmission beam, and evaluate each transmission beam based on the measured values. In operation 1010, the UE may report, to the base station, information for Ni best beams selected from among the $M_1$ transmission beams and information for the RSRP of the best beams.

In operation 1012, the base station may determine the beamwidth (e.g., the number $M_2$ of beam coverages) based on the report in operation 1010 and the codebook having the beamwidth. In operation 1014, the base station may perform beam sweeping through $M_2$ transmission beams generated according to the determined codebook.

Thereafter, beam sweeping by the base station and beam/RSRP comparison by the UE may be repeated.

In operation 1016, the UE may report, to the base station, information for Nu best beams and information for the RSRP of the best beams. Upon determining that the RSRP for the Nu best beams meets the desired beam quality of the UE, the UE may transmit, to the base station, a signal requesting the base station to terminate beam training, e.g., stop flag, in operation 1018. Although not shown, if the beam training is stopped, the base station may determine to use at least one of the Nu best beams in transmitting the PDSCH to the UE. PDSCH transmission between the base station and the UE may refer to operations 914 and 918.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a base station supporting beam training using a beamforming codebook, the method comprising:
storing a plurality of codebooks corresponding to a plurality of different beamwidths;
receiving a beam adjustment request from a user equipment (UE);
determining, among the plurality of codebooks, a codebook including beam codebooks for beam coverages including a beamwidth corresponding to a channel state of the UE, in response to receiving the beam adjustment request; and
transmitting, to the UE, signals that are beamformed based on the codebook through a plurality of transmission beams using digital beamforming matrixes of the codebook,
wherein each beam codebook $q_m$ of the beam codebooks included in the codebook is configured based on a product of a transmission analog beamforming matrix and a baseband digital processing vector that are obtained based on a beam codeword $v_m$ for an m-th beam coverage, and
wherein the beam codeword $v_m$ is obtained based on a beam gain vector $[g_m]_k$ corresponding to a k-th oversampled angle of departure (AoD) and an array steering matrix A.

2. The method of claim 1, wherein the beam codeword $v_m$ is obtained by an equation below:

$$v_m = \frac{(AA^H)^{-1} A \tilde{g}_m}{\left\|(AA^H)^{-1} A \tilde{g}_m\right\|_2}$$

wherein the beam gain vector $[g_m]_k$ is estimated based on an amplitude factor T(m) and a phase factor $a_k$ for mitigating beam gain fluctuation within the m-th beam coverage, by an equation below:

$$[\hat{g}_m]_k = \frac{1}{T(a_k)} \exp\left[-j\frac{(N-1)\pi a_k}{2}\right], k \in \{1, 2, \ldots, K\}$$

wherein N is a number of antennas of the base station, and K is a number of over-sampled AoDs.

3. The method for claim 1, wherein the beam adjustment request includes at least one of information indicating the channel state of the UE or information indicating a desired beam quality of the UE.

4. The method of claim 1, further comprising:
receiving, from the UE, a report indicating one or more transmission beams;
transmitting, based on the report, a signal requesting to enable the beam training through at least one transmission beam among the plurality of transmission beams; and
receiving, from the UE, a signal requesting to terminate the beam training.

5. A method performed by a user equipment (UE) performing beam training using a beamforming codebook, the method comprising:
storing a plurality of codebooks corresponding to a plurality of different beamwidths;
transmitting a beam adjustment request to a base station;
determining, among the plurality of codebooks, a codebook including beam codebooks for beam coverages including a beamwidth corresponding to a channel state of the UE based on the beam adjustment request; and
performing beam training based on receiving signals that are beamformed through a plurality of transmission beams from the base station using digital beamforming matrixes of the codebook,
wherein each beam codebook $q_m$ of the beam codebooks included in the codebook is configured based on a product of a transmission analog beamforming matrix and a baseband digital processing vector that are obtained based on a beam codeword $v_m$ for an m-th beam coverage, and
wherein the beam codeword $v_m$ is obtained based on a beam gain vector $[g_m]_k$ corresponding to a k-th oversampled angle of departure (AoD) and an array steering matrix A.

6. The method of claim 5, wherein the beam codeword $v_m$ is obtained, by an equation below:

$$v_m = \frac{(AA^H)^{-1} A \tilde{g}_m}{\left\|(AA^H)^{-1} A \tilde{g}_m\right\|_2}$$

wherein the beam gain vector $[g_m]_k$ is estimated, based on an amplitude factor T(m) and a phase factor $a_k$ for mitigating beam gain fluctuation within the m-th beam coverage, by an equation below:

$$[\hat{g}_m]_k = \frac{1}{T(a_k)} \exp\left[-j\frac{(N-1)\pi a_k}{2}\right], k \in \{1, 2, \ldots, K\}$$

wherein N is a number of antennas of the base station, and K is a number of over-sampled AoDs.

7. The method for claim 5, wherein the beam adjustment request includes at least one of information indicating the channel state of the UE or information indicating a desired beam quality of the UE.

8. The method of claim 5, wherein performing the beam training includes:
transmitting, to the base station, a report indicating one or more transmission;
receiving, based on the report, a signal requesting to enable the beam training through at least one transmission beam among the plurality of transmission beams; and
transmitting, to the base station, a signal requesting to terminate the beam training.

9. A base station supporting beam training using a beamforming codebook, the base station comprising:
a transceiver; and
a controller operable connected with the transceiver, the controller configured to:
store a plurality of codebooks corresponding to a plurality of different beamwidths;
receive a beam adjustment request from a user equipment (UE);

determine, among the plurality of codebooks, a codebook including beam codebooks for beam coverages including a beamwidth corresponding to a channel state of the UE, in response to receiving the beam adjustment request; and transmit, to the UE, signals that are beamformed based on the codebook through a plurality of transmission beams using digital beamforming matrixes of the codebook, wherein each beam codebook $q_m$ of the beam codebooks included in the codebook is configured based on a product of a transmission analog beamforming matrix and a baseband digital processing vector that are obtained based on a beam codeword $v_m$ for an m-th beam coverage, and wherein the beam codeword $v_m$ is obtained based on a beam gain vector $[g_m]_k$ corresponding to a k-th over-sampled angle of departure (AoD) and an array steering matrix A.

10. The base station of claim 9, wherein the beam codeword $v_m$ is obtained, by an equation below:

$$v_m = \frac{(AA^H)^{-1} A \tilde{g}_m}{\left\| (AA^H)^{-1} A \tilde{g}_m \right\|_2}$$

the beam gain vector $[g_m]_k$ is estimated, based on an amplitude factor T(m) and a phase factor $a_k$ for mitigating beam gain fluctuation within the m-th beam coverage, by an equation below:

$$[\hat{g}_m]_k = \frac{1}{T(a_k)} \exp\left[-j \frac{(N-1)\pi a_k}{2}\right], k \in \{1, 2, \ldots, K\}$$

wherein N is a number of antennas of the base station, and K is a number of over-sampled AoDs.

11. The base station of claim 9, wherein the beam adjustment request includes at least one of information indicating the channel state of the UE or information indicating a desired beam quality of the UE.

12. The base station of claim 9, wherein the controller is further configured to:
receive, from the UE, a report indicating one or more transmission beams;
transmit, based on the report, a signal requesting to enable the beam training through at least one transmission beam among the plurality of transmission beams; and
receive, from the UE, a signal requesting to terminate the beam training.

13. A user equipment (UE) performing beam training using a beamforming codebook, the UE comprising:
a transceiver; and
a controller operably connected with the transceiver, the controller configured to:
store a plurality of codebooks corresponding to a plurality of different beamwidths;
transmit a beam adjustment request to a base station;
determine, among the plurality of codebooks, a codebook including beam codebooks for beam coverages including a beamwidth corresponding to a channel state of the UE based on the beam adjustment request; and
perform beam training based on receiving signals that are beamformed through a plurality of transmission beams from the base station using digital beamforming matrixes of the codebook,
wherein each beam codebook $q_m$ of the beam codebooks included in the codebook is configured based on a product of a transmission analog beamforming matrix and a baseband digital processing vector that are obtained based on a beam codeword $v_m$ for an m-th beam coverage, and
wherein the beam codeword $v_m$ is obtained based on a beam gain vector $[g_m]_k$ corresponding to a k-th over-sampled angle of departure (AoD) and an array steering matrix A.

14. The UE of claim 13, wherein the beam codeword $v_m$ is obtained, by an equation below:

$$v_m = \frac{(AA^H)^{-1} A \tilde{g}_m}{\left\| (AA^H)^{-1} A \tilde{g}_m \right\|_2}$$

the beam gain vector $[g_m]_k$ is estimated, based on an amplitude factor T(m) and a phase factor $a_k$ for mitigating beam gain fluctuation within the m-th beam coverage, by an equation below:

$$[\hat{g}_m]_k = \frac{1}{T(a_k)} \exp\left[-j \frac{(N-1)\pi a_k}{2}\right], k \in \{1, 2, \ldots, K\}$$

wherein N is a number of antennas of the base station, and K is a number of over-sampled AoDs.

15. The UE of claim 13, wherein the beam adjustment request includes at least one of information indicating the channel state of the UE or information indicating a desired beam quality of the UE.

16. The UE of claim 13, wherein the controller is configured to:
transmit, to the base station, a report indicating one or more transmission beams;
receive, based on the report, a signal requesting to enable the beam training through at least one transmission beam among the plurality of transmission beams based on the report; and
transmit, to the base station, a signal requesting to terminate the beam training.

* * * * *